United States Patent
Koch et al.

[11] Patent Number: 6,164,254
[45] Date of Patent: Dec. 26, 2000

[54] METHOD FOR SETTING VALVE LIFT

[75] Inventors: Achim Koch, Tegernheim; Bernhard Klingseis, Regensburg, both of Germany

[73] Assignee: Siemens Aktiengesellschaft, Munich, Germany

[21] Appl. No.: 09/503,390

[22] Filed: Feb. 14, 2000

Related U.S. Application Data

[63] Continuation of application No. PCT/DE98/02310, Aug. 11, 1998.

[30] Foreign Application Priority Data

Aug. 14, 1997 [DE] Germany .......................... 197 35 366

[51] Int. Cl.[7] .............................. F01L 13/00; F02D 13/02
[52] U.S. Cl. ...................................... 123/90.15; 123/90.17
[58] Field of Search ............................. 123/90.15, 90.16, 123/90.17, 90.18

[56] References Cited

U.S. PATENT DOCUMENTS

| | | | |
|---|---|---|---|
| 4,722,315 | 2/1988 | Pickel | 123/568 |
| 5,611,304 | 3/1997 | Shinojima | 123/90.15 |
| 5,690,065 | 11/1997 | Vuuren | 123/90.16 |

FOREIGN PATENT DOCUMENTS

| | | |
|---|---|---|
| 0638706A1 | 2/1995 | European Pat. Off. . |
| 3210914A1 | 9/1983 | Germany . |
| 3437330A1 | 4/1986 | Germany . |
| 3619956A1 | 12/1987 | Germany . |
| 3924934A1 | 2/1990 | Germany . |
| 4244550A1 | 7/1994 | Germany . |
| 4324902A1 | 2/1995 | Germany . |

OTHER PUBLICATIONS

Published International Application No. 95/13458 (Janse Van Vuuren), dated May 18, 1995.

*Primary Examiner*—Weilun Lo
*Attorney, Agent, or Firm*—Herbert L. Lerner; Laurence A. Greenberg; Werner H. Stemer

[57] ABSTRACT

A method for setting the valve lift of an inlet valve of an internal combustion engine at full load. A full-load demand triggers an adaptation function by use of which the valve lift can be set to realize a maximum air mass flow into a cylinder of the internal combustion engine.

7 Claims, 2 Drawing Sheets

METHOD FOR SETTING VALVE LIFT

CROSS-REFERENCE TO RELATED APPLICATION

This is a continuation of copending International Application PCT/DE98/02310, filed Aug. 11, 1998, which designated the United States.

BACKGROUND OF THE INVENTION

1. Field of the Invention

The invention relates to a method for setting the valve lift of an inlet valve of an internal combustion engine.

In the case of conventional Otto-type engines with throttle-valve load control, full load corresponds to the state in which the throttle valve is fully open. However, the prior art also includes devices for the variable control of the valves of internal combustion engines, in particular for load control of Otto-type engines, by use of the inlet-lift functions of the inlet valves, in which the lift and the duration of opening of the inlet valves can be varied. Various systems are known for this purpose, e.g. Published, European Patent Application EP 0 638 706 A1 or Published, Non-Prosecuted German Patent Application DE 42 44 550 A1. The latter document includes an explanation of a coupler mechanism by use of which two camshafts can be rotated relative to one another. The associated valve is actuated by a transmission lever that senses the cam position of both camshafts, thus allowing the valve lift to be varied. Camshaft adjustment is useful, in particular, in eliminating exhaust and refill losses.

Published, Non-Prosecuted German Patent Application DE 32 10 914 A1 relates to a camshaft control unit for the speed-dependent and load-dependent angular adjustment of a camshaft of an internal combustion engine. Here, a fixed desired value is read out from a desired-value memory as a function of load and rotational speed for the purpose of camshaft adjustment.

International Patent Application WO 95/13458 has disclosed a method for optimizing the charging of a cylinder by varying the closing point of an inlet valve in an internal combustion engine with hydraulic or electromagnetic adjustment of the closing point.

SUMMARY OF THE INVENTION

It is accordingly an object of the invention to provide a method for setting valve lift which overcomes the above-mentioned disadvantages of the prior art methods of this general type, by which the optimum valve lift can be determined and set at full load as a function of a rotational speed in the case of an internal combustion engine with a variable valve lift.

With the foregoing and other objects in view there is provided, in accordance with the invention, a method for setting a maximum valve lift of an inlet valve of an internal combustion engine, which includes:

controlling an actuator for adjusting a valve gear associated with the inlet valve of at least one cylinder;

determining, in an event of full-load demand, a desired value for the maximum valve lift from a characteristic map in dependence on an instantaneous speed of the internal combustion engine;

correcting the desired value such that an intake mass flow into the at least one cylinder is at a maximum at the instantaneous speed and resulting in a corrected desired value; and controlling the actuator in dependence on the corrected desired value.

Thus, in the case of a load control with a variable valve lift, the full-load operating point is reached at different rotational speeds with particular valve lifts that differ in each case from the maximum lift. In order to determine the optimum valve lift as a function of the rotational speed in the event of a full-load demand, a correction function is, according to the invention, triggered in the engine control unit. The correction function determines the valve lift at which the optimum mass flow into the cylinder is obtained at any rotational speed. The correction is triggered as soon as a full-load demand is detected. A desired value for the valve lift is determined from a characteristic map as a function of the current rotational speed. The desired values in the characteristic map are determined on an engine test bed or by simulation calculations. The desired values are determined in such a way that the optimum mass flow into the cylinder is obtained in each case.

The desired value of the valve lift is first of all increased in steps and then reduced in steps. The increased or reduced desired value of the valve stroke is in each case set and the associated mass flow into the cylinder is measured. The maximum mass flow achieved when setting the valve lift is then determined and the associated valve lift is set. The values in the characteristic map can now be corrected and the corrected valve lift is thus available next time there is a full-load demand.

According to the invention, this solves the setting problems resulting from manufacturing tolerances when, for example, the setting mechanism for the valve lift is exchanged and the desired values for the valve lift which lead to the full-load engine operating state change accordingly. The correction according to the invention thus allows any power losses that might result from this to be avoided. Even in normal operation, however, wear and the effects of temperature may lead to a shift in the full-load characteristic. According to the invention, it is thus possible to maintain the power potential of the internal combustion engine over its entire service life.

Other features which are considered as characteristic for the invention are set forth in the appended claims.

Although the invention is illustrated and described herein as embodied in a method for setting valve lift, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
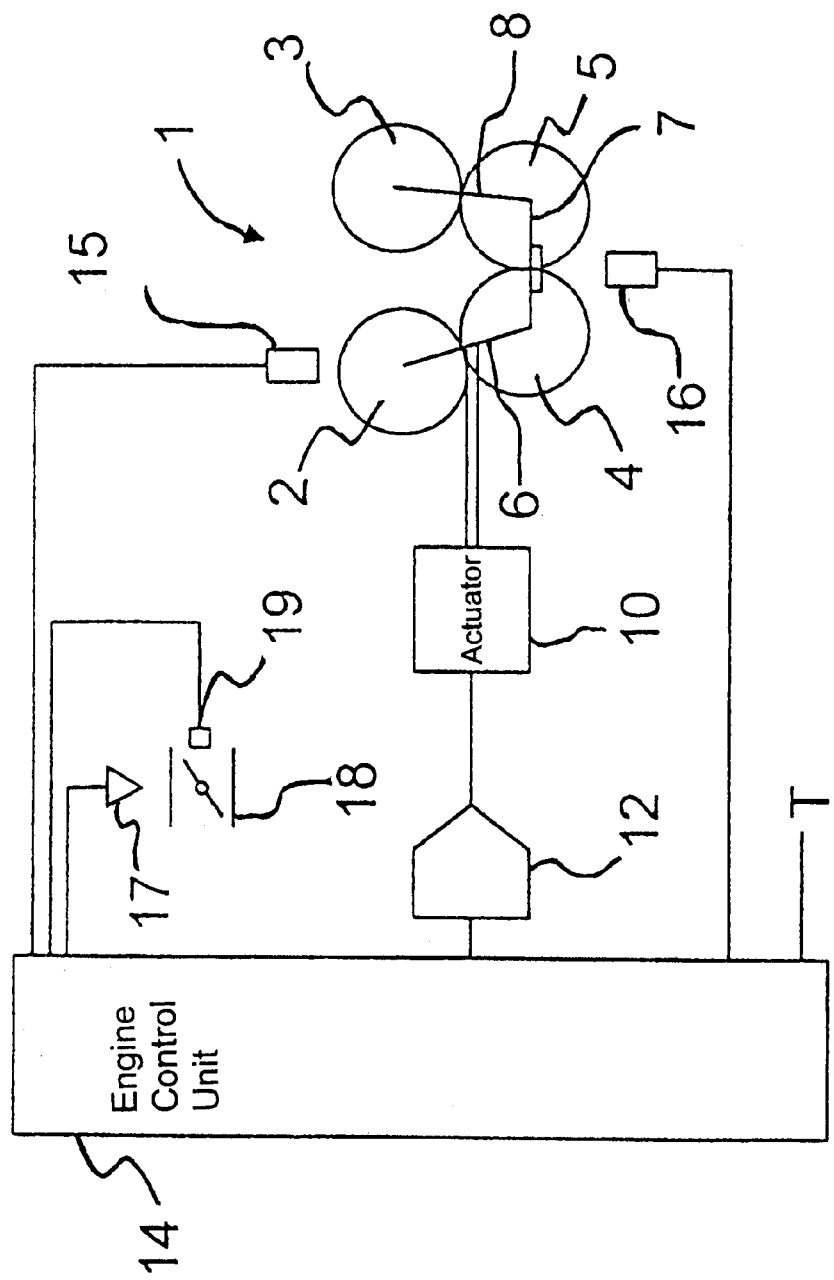
FIG. 1 is a block diagram illustrating control of an actuator for a valve gear according to the invention.

In all the figures of the drawing, sub-features and integral parts that correspond to one another bear the same reference symbol in each case. Referring now to the figures of the drawing in detail and first, particularly, to FIG. 1 thereof, there is shown a valve gear 1 known from Published, Non-Prosecuted German Patent Application DE 42 44 550 A1 having two camshafts 2 and 3, on the cams of which a respective non-illustrated roller runs. The two rollers are connected to one another by a transmission lever and actuate a non-illustrated valve. The first camshaft 2 is driven by a crankshaft and the second camshaft 3 is driven via two intermediate gearwheels 4 and 5, which are connected to one another by three couplers 6, 7 and 8. An actuator 10 acts on the coupler 6 of the coupler mechanism. By virtue of the meshing of the gearwheels 4 and 5, a pivoting of the coupler 6 about an axis of rotation of the camshaft 2 rotates the camshaft 3 relative to the camshaft 2. This enables the timing and lift of an associated inlet valve to be varied.

The actuator 10 for adjusting the coupler mechanism is driven by a power output stage 12, which receives a drive signal, in particular a pulse-width-modulated signal, from an engine control unit 14. Also provided is a sensor 15, which measures a speed of rotation of the camshaft 2, this being a measure of the speed of the crankshaft. Another sensor 16 measures the adjustment of the coupler mechanism and is thus a measure of the valve lift set by the coupler mechanism. The engine control unit 14 is furthermore supplied by an accelerator pedal transmitter 17 with a signal which is produced when there is a demand for full load at the accelerator pedal and with a measurement signal for a coolant temperature T.

Figure 2:
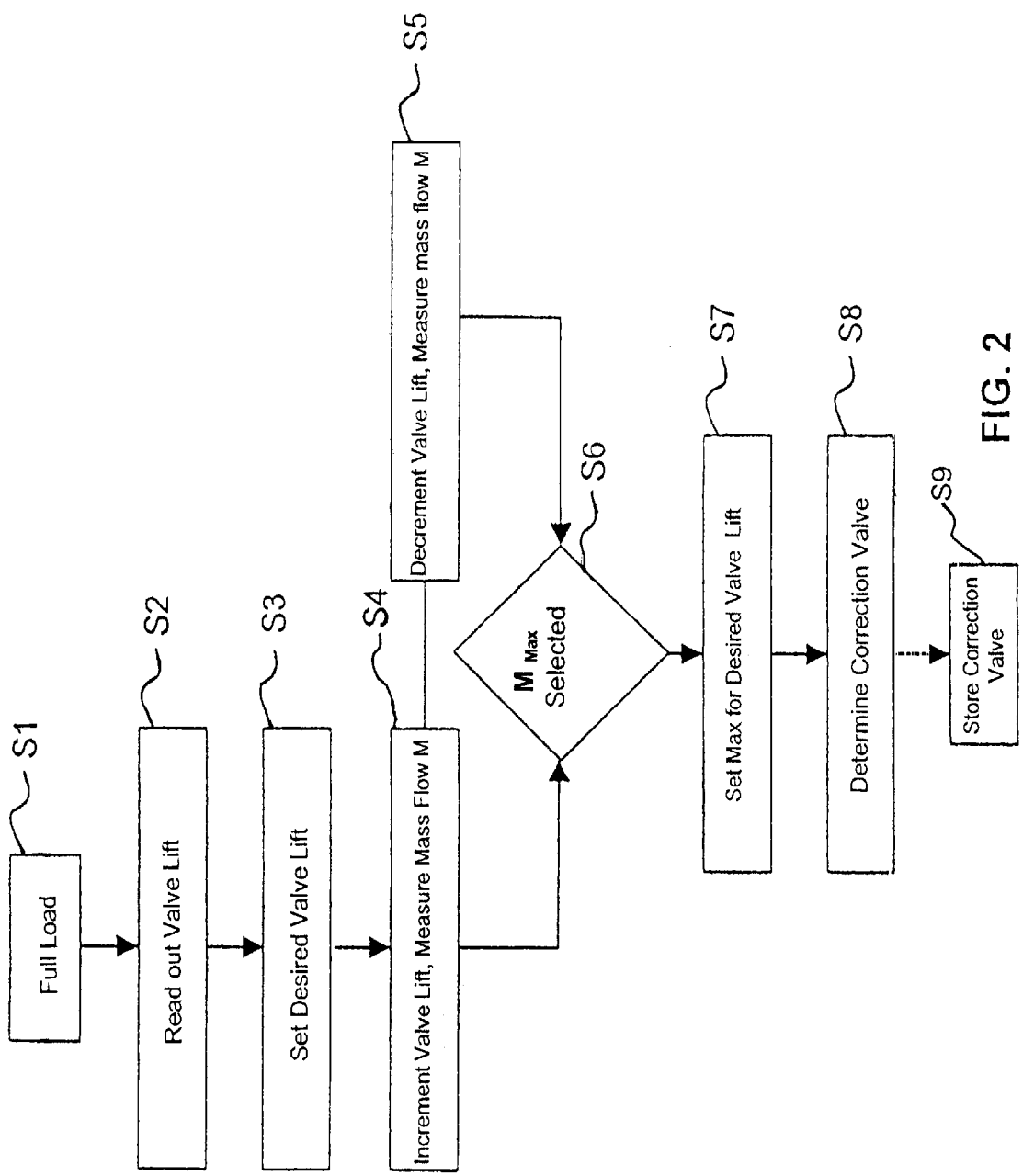
FIG. 2 is a flow chart illustrating an adaptation function.

The signal processing procedure for the correction function according to the invention is illustrated in the flow chart in FIG. 2. If the temperature T of the engine coolant rises above a predetermined value and a full load is detected in the control unit 14, the below listed algorithm formed of steps S1–S9 is triggered.

In step S1 the full-load demand on the part of the accelerator pedal transmitter 17 is interrogated.

In step S2, a desired value for the valve lift is determined from a characteristic map as a function of the current rotational speed and corrected by use of a correction value.

In step S3, the corrected desired value of the valve lift is set by the actuator.

In step, S4, the desired value of the valve lift is adjusted upwards in predetermined steps, i.e. in the direction of larger valve lifts, and set by the actuator and, at the same time, the respective mass flow M is measured in a sensor 19 of an intake duct 18 and preferably used by an observer to determine the mass flow into a cylinder of the internal combustion engine. The rotational speed must here remain within certain limiting values. Pairs of data containing the intake mass flow M and the valve lift set are thus obtained.

In step S5, the desired value of the valve lift is adjusted downwards in predetermined steps and set by the actuator and the mass flow M which occurs in the process is measured. The pairs of data are stored, it being a requirement that the rotational speed should remain within certain limiting values.

In step S6, the pair of data that contains the maximum intake mass flow Mmax is selected.

In step S7, the adjusted desired value of the valve lift associated with the maximum mass flow Mmax is now set by the actuator.

In step S8, a correction value is determined from the selected adjusted desired value of the valve lift and the desired value of the valve lift determined from the characteristic map and the correction value is stored. The correction value can be determined by subtraction and is then determined by the difference between the two values. The correction value can also be determined by multiplication as a correction factor.

In step S9, the correction value is stored and can be called up at the next full-load demand, as in step S2.

As an alternative, the selected adjusted desired value is stored as a new desired value as a function of the rotational speed.

The correction can admittedly be carried out not only on the valve gear illustrated in FIG. 1 but also on other valve gear, for example in the case of valves with a magnet-type drive.

We claim:

1. A method for setting a maximum valve lift of an inlet valve of an internal combustion engine, which comprises:
    controlling an actuator for adjusting a valve gear associated with the inlet valve of at least one cylinder;
    determining, in an event of full-load demand, a desired value for the maximum valve lift from a characteristic map in dependence on an instantaneous speed of the internal combustion engine;
    correcting the desired value such that an intake mass flow into the at least one cylinder is at a maximum at the instantaneous speed and resulting in a corrected desired value; and
    controlling the actuator in dependence on the corrected desired value.

2. The method according to claim 1, which comprises determining the maximum valve lift at which a maximum mass flow into the at least one cylinder at the instantaneous speed is achieved by adjusting the desired value of the maximum valve lift and measuring the intake mass flow into the at least one cylinder.

3. The method according to claim 1, which comprises performing a correction function having the steps:
    determining if the full-load demand exists;
    setting the maximum valve lift to the desired value stored during a last full-load correction;
    adjusting the desired value of the maximum valve lift upwards in predetermined steps and, in parallel, storing pairs of data containing a detected mass flow into the at least one cylinder and an associated adjusted desired value of the maximum valve lift, it being a requirement that a rotational speed remain within certain limits during the step;
    adjusting the desired value of the maximum valve lift downwards in predetermined steps and, in parallel, storing further pairs of data containing the detected mass flow and an associated adjusted maximum valve lift, it being a requirement that the rotational speed remain within certain limits during the step;
    selecting a pair of data that contains the maximum mass flow into the at least one cylinder and determining a correction value from a selected adjusted desired value of the maximum valve lift and the desired value of the maximum valve lift determined from the characteristic map in dependence on a current rotational speed; and
    storing the correction value in a table memory and correcting the desired value with the correction value.

4. The method according to claim 3, wherein the correction value is a correction factor by which the desired value of the maximum valve lift taken from the characteristic map is multiplied.

5. The method according to claim 3, which comprises determining the correction value from a difference between a selected valve lift and the maximum valve lift taken from the characteristic map.

6. The method according to claim 1, which comprises triggering a correction when a predetermined coolant temperature is exceeded and there is the full-load demand.

7. The method according to claim 1, which comprises adjusting the maximum valve lift by relative rotation of two camshafts actuating the inlet valve.

* * * * *